US012012869B2

(12) United States Patent
Bianchi et al.

(10) Patent No.: US 12,012,869 B2
(45) Date of Patent: Jun. 18, 2024

(54) PART COATED WITH A COMPOSITION FOR PROTECTION AGAINST CMAS WITH CONTROLLED CRACKING, AND CORRESPONDING TREATMENT METHOD

(71) Applicant: SAFRAN, Paris (FR)

(72) Inventors: Luc Bianchi, Moissy-Cramayel (FR); Aurélien Joulia, Moissy-Cramayel (FR); André Hubert Louis Malie, Moissy-Cramayel (FR); Benjamin Dominique Roger Joseph Bernard, Moissy-Cramayel (FR)

(73) Assignee: SAFRAN, Paris (FR)

( * ) Notice: Subject to any disclaimer, the term of this patent is extended or adjusted under 35 U.S.C. 154(b) by 1025 days.

(21) Appl. No.: 16/958,422

(22) PCT Filed: Dec. 26, 2018

(86) PCT No.: PCT/FR2018/053549
§ 371 (c)(1),
(2) Date: Dec. 10, 2020

(87) PCT Pub. No.: WO2019/129996
PCT Pub. Date: Jul. 4, 2019

(65) Prior Publication Data
US 2021/0140327 A1    May 13, 2021

(30) Foreign Application Priority Data

Dec. 27, 2017  (FR) ...................................... 1763278

(51) Int. Cl.
*C04B 41/89*  (2006.01)
*C04B 41/00*  (2006.01)
(Continued)

(52) U.S. Cl.
CPC ............ *F01D 5/288* (2013.01); *C04B 41/009* (2013.01); *C04B 41/5024* (2013.01);
(Continued)

(58) Field of Classification Search
CPC ...... C04B 2103/001; C04B 2103/0021; C04B 35/80; C04B 41/009; C04B 41/4527;
(Continued)

(56) References Cited

U.S. PATENT DOCUMENTS

| 2013/0224457 A1 | 8/2013 | Lee |
| 2016/0186580 A1 | 6/2016 | Zaleski et al. |
| 2016/0257618 A1 | 9/2016 | Jordan et al. |

FOREIGN PATENT DOCUMENTS

| EP | 2 202 212 A2 | 6/2010 |
| WO | 2011/123432 A1 | 10/2011 |

OTHER PUBLICATIONS

International Search Report dated Apr. 17, 2019, in International Application No. PCT/FR2018/053549.
(Continued)

*Primary Examiner* — Lawrence D Ferguson
(74) *Attorney, Agent, or Firm* — Sughrue Mion, PLLC

(57) ABSTRACT

The invention relates to a turbomachine part comprising a substrate consisting of a metal material, or a composite material, and also comprising a layer of a coating for protection against the infiltration of CMAS-type compounds, at least partially covering the surface of the substrate, the protective coating layer comprising a plurality of elementary layers including elementary layers of a first assembly of elementary layers inserted between elementary layers of a second assembly of elementary layers, each elementary layer of the first assembly and each elementary layer of the second assembly comprising an anti-CMAS compound, and each contact zone between an elementary
(Continued)

layer of the first assembly and an elementary layer of the second assembly forming an interface conducive to the spreading of cracks along said interface.

11 Claims, 8 Drawing Sheets

(51) Int. Cl.
 *C04B 41/50* (2006.01)
 *C04B 41/52* (2006.01)
 *F01D 5/28* (2006.01)
 *F01D 25/00* (2006.01)
(52) U.S. Cl.
 CPC ...... *C04B 41/5042* (2013.01); *C04B 41/5072* (2013.01); *C04B 41/522* (2013.01); *C04B 41/89* (2013.01); *F01D 25/00* (2013.01); *F05D 2220/30* (2013.01); *F05D 2230/31* (2013.01); *F05D 2230/90* (2013.01)
(58) Field of Classification Search
 CPC ............ C04B 41/5024; C04B 41/5027; C04B 41/5042; C04B 41/5072; C04B 41/52; C04B 41/522; C04B 41/89; F01D 25/00; F01D 25/007; F01D 5/288; F05D 2220/30; F05D 2230/31; F05D 2230/90; F05D 2260/95; F05D 2300/50; F05D 2300/50212; Y02W 10/10
 See application file for complete search history.

(56) References Cited

OTHER PUBLICATIONS

International Search Report for PCT/FR2018/053549 dated Apr. 17, 2019 [PCT/ISA/210].

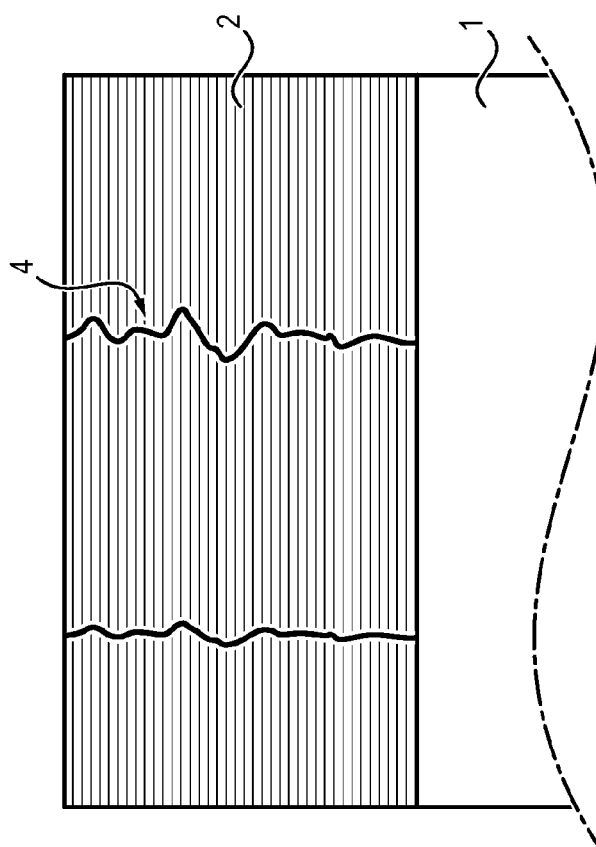
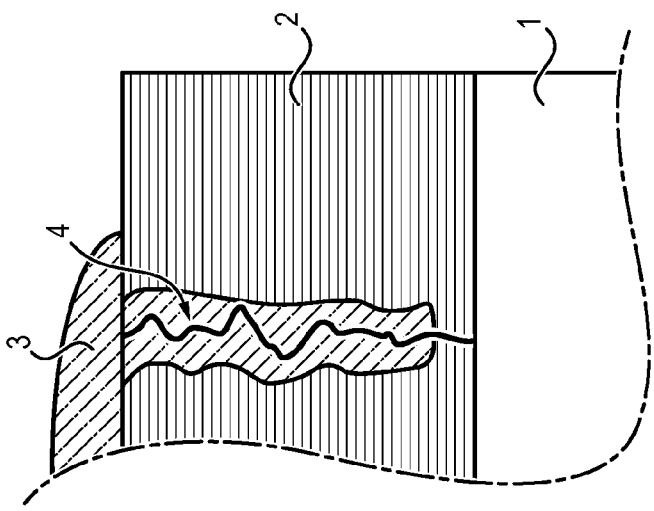

PART COATED WITH A COMPOSITION FOR PROTECTION AGAINST CMAS WITH CONTROLLED CRACKING, AND CORRESPONDING TREATMENT METHOD

CROSS REFERENCE TO RELATED APPLICATIONS

This application is a National Stage of International Application No. PCT/FR2018/053549 filed on Dec. 26, 2018, claiming priority based on French Patent Application No. 1763278 filed on Dec. 27, 2017. The entire contents of each of which are herein incorporated by reference in their entireties.

TECHNICAL FIELD OF THE INVENTION

The invention relates to a turbomachine part, such as a high-pressure turbine blade or a combustion chamber wall.

RELATED ART

In a turbojet engine, the exhaust gases generated by the combustion chamber can reach high temperatures, in excess of 1200° C. or even 1600° C. The parts of the turbojet engine in contact with these exhaust gases must be capable of maintaining their mechanical properties at these high temperatures. In particular, the components of high-pressure turbines, or HPT, must be protected against an excessive rise in surface temperature in order to guarantee their functional integrity and limit oxidation and corrosion.

It is known to manufacture certain parts of the turbojet engine in "superalloy". Superalloys are a family of high-strength metal alloys that can work at temperatures relatively close to their melting points (typically 0.7 to 0.8 times their melting temperatures). It is also known to fabricate parts from ceramic matrix composites, or CMC.

It is known to cover the surface of parts made of said materials with a coating acting as a thermal barrier and/or an environmental barrier.

A thermal or environmental barrier generally comprises a thermally insulating layer whose function is to limit the surface temperature of the coated component, and a protective layer to protect the substrate from oxidation and/or corrosion. The ceramic layer generally covers the protective layer. By way of example, the thermally insulating layer can be made of yttriated zirconia.

A metallic undercoat can be deposited before the protective layer, and the protective layer can be formed by oxidation of the metallic undercoat. The metallic undercoat provides a bond between the surface of the superalloy substrate and the protective layer: the metal underlay is sometimes referred to as the "bond coat".

In addition, the protective layer can be pre-oxidized prior to the deposition of the thermal insulation layer to form a dense alumina layer, usually called thermally-grown oxide (TGO), to promote the adhesion of the thermal insulation layer and enhance the protective function against oxidation and corrosion.

It is crucial to ensure a satisfactory service life of the thermal and environmental barriers throughout the operating cycles of the turbomachine parts. This service life is notably conditioned by the resistance of the barrier to thermal cycling on the one hand, and to environmental aggressions such as erosion and corrosion on the other. The thermal or environmental barrier is likely to degrade rapidly in the presence of particles rich in silica-type inorganic compounds, or if it is located in an atmosphere rich in compounds commonly known as CMAS, including in particular oxides of calcium, magnesium, aluminum and silicon. CMAS is likely to infiltrate the thermal or environmental barrier in the molten state, particularly in cracks formed in the internal volume of the barrier layers. Once infiltrated, particles of CMAS compounds can cause partial chemical dissolution of the barrier, or they can stiffen within the barrier and lower the mechanical strength properties of the thermal or environmental barrier.

To prevent the penetration of high-temperature liquid contaminants such as CMAS compounds into coating layers, anti-CMAS depositions are known to promote the formation of a tight barrier layer on the surface of the coated part by spontaneous chemical reaction between chemical species of anti-CMAS depositions and CMAS compounds. The tight barrier layer thus formed blocks the progress of the molten CMAS compounds within the part to be protected. Such anti-CMAS depositions can be applied either directly on the substrate to form a complete thermal or environmental barrier, or in a functionalization layer. The reaction kinetics between the anti-CMAS deposition and the CMAS compounds is then in competition with the infiltration kinetics of the CMAS compounds within the coating, and particularly within cracks in the coating.

However, the effectiveness of anti-CMAS depositions is reduced when the part to be protected presents a transverse crack.

Throughout the following description, a "transverse crack" refers to a plurality of cracks having a general orientation substantially orthogonal to the plane tangential to the surface of the coated part. Annexed FIGS. 1a, 1b and 1c illustrate the phenomenon of capillary penetration of CMAS compounds from ambient air into a network of cracks within the external surface of a part. In FIG. 1a, the part, which may be a high-pressure turbine blade of a turbomachine, has a layer 2 of anti-CMAS deposition, of substantially uniform thickness, on its surface. The anti-CMAS layer includes a substantially transverse crack 4. This crack 4 is part of a larger network of transverse cracks comprising through cracks for the layer 2, orthogonal to the surface and with little deviation. In FIG. 1b, particles of CMAS compounds, melted due to the high surface temperature at the layer 2 during blade operation, form a liquid phase 3 at the surface of the layer 2. This liquid phase 3 is partially infiltrated into the crack 4. In FIG. 1c, which represents the system in a later state than that of FIG. 1b, the chemical species present in the anti-CMAS deposition layer 2 have reacted with the infiltrated CMAS compounds to form a blocking phase 5 on the perimeter of the crack 4. The blocking phase 5 is schematized here by a network of contiguous pentagonal shapes. This blocking phase 5 blocks the infiltration of the CMAS compounds of the liquid phase 3. In addition, a secondary phase 6 can form in places, this secondary phase 6 being represented by the circular shapes shown in FIG. 1c. Here, the crack 4 being substantially transverse, the liquid phase 3 rapidly infiltrates over the entire thickness of the anti-CMAS deposition layer 2, the infiltration kinetics of the molten CMAS compounds outweighing the kinetics of the chemical reaction leading to the formation of the blocking phase. This weakens the layer 2 and reduces the service life of the part.

Thus, there is a need for a surface treatment of a turbomachine part, comprising the application of a thermal and/or environmental barrier having a guaranteed integrity throughout the life cycle of the part, in an environment loaded with CMAS compounds. In particular, a problem arises regarding the mechanical resistance of the anti-CMAS deposition layers arranged on the surface of turbine parts to the infiltration of molten CMAS compounds.

GENERAL PRESENTATION OF THE INVENTION

The invention responds to the abovementioned needs by providing a turbomachine part comprising a substrate made of a metallic material, or of a composite material, and comprising a protective coating layer against the infiltration of compounds of the calcium, magnesium, aluminum or silicon oxide type, or CMAS, the coating layer at least partially covering the surface of the substrate,

- the protective coating layer comprising a plurality of elementary layers, comprising elementary layers of a first set of elementary layers interposed between elementary layers of a second set of elementary layers, each contact zone between an elementary layer of the first set and an elementary layer of the second set forming an interface promoting the propagation of cracks along said interface.

A part according to the invention therefore has an anti-CMAS coating layer which promotes the deflection of possible cracks in a direction substantially parallel to the surface of the part. The capillary penetration of CMAS-type compounds melted during operation of the part is intended to be minimized. Indeed, the liquid phase formed by the molten CMAS compounds, instead of propagating within the cracks in a direction substantially orthogonal to the thickness of the successive layers of coating and rapidly reaching the substrate of the part, infiltrates into tortuosities formed by the cracks along the interfaces of elementary layers. The kinetics of the reaction of formation of a blocking phase involving chemical compounds of the coating is promoted over the infiltration kinetics of molten CMAS compounds.

Another advantage provided by the invention is to allow cracking of the anti-CMAS coating layers while ensuring good mechanical resistance due to the reduction of the infiltrated CMAS compounds. The presence of cracks within the coating allows to accommodate thermomechanical deformations on the surface of the part, without generating more important fractures which would harm the resistance of the part.

Additional and non-limiting features of a turbomachine part according to the invention are as follows, taken alone or in any of their technically possible combinations:

- the elementary layers of the first set have toughnesses which differ by at least 0.7 Mpa·m$^{1/2}$ from the toughnesses of the elementary layers of the second set,
- the elementary layers of the first set may for example have a toughness of between 0.5 and 1.5 MPa·m$^{1/2}$ and the elementary layers of the second set may have a toughness of between 1.5 and 2.2 MPa·m$^{1/2}$.

The change in toughness between two consecutive elementary layers induces preferential cracking in the direction of the interface between the consecutive layers, especially during operation and possibly at the end of manufacture after cooling;

- the elementary layers of the second set comprise a material from the following list: YSZ, Y2O3-ZrO2-Ta2O5, BaZrO3, CaZrO3, SrZrO3, or comprise a mixture of several of these materials;
- the elementary layers of the first set comprise a material taken from the following list: RE2Zr2O7 with RE a material of the rare earth family, Ba(Mg1/3Ta2/3)O3, La(Al1/4Mg1/2Ta1/4)O3, or comprise a mixture of several of these materials;
- the elementary layers of the first set have coefficients of thermal expansion which differ by at least 3.5 10$^{-6}$ K$^{-1}$ from the coefficients of thermal expansion of the elementary layers of the second set,
- the elementary layers of the first set being able to have a coefficient of thermal expansion of between 3.5 and 6.0 10$^{-6}$ K$^{-1}$ and the elementary layers of the second set being able to have a coefficient of thermal expansion of between 7.0 and 12.0 10$^{-6}$ K$^{-1}$.

The change in the coefficient of thermal expansion between two consecutive elementary layers induces preferential cracking in the direction of the interface between the consecutive layers, especially during operation and possibly at the end of manufacture after cooling;

- the elementary layers of the second set comprise a material from the following list: YSZ, Y2O3-ZrO2-Ta2O5, BaZrO3, CaZrO3, SrZrO3, RE2Zr2O7 with RE a material of the rare earth family, Ba(Mg1/3Ta2/3)O3, La(Al1/4Mg1/2Ta1/4)O3, YAG, or comprise a mixture of several of these materials;
- the elementary layers of the first set comprise RE2Si2O7 or RE2SiO5 with RE a material of the rare earth family, or comprise a mixture of these materials;
- the ratio of the cumulative thickness of the elementary layers of the first set to the cumulative thickness of the elementary layers of the second set is comprised between 1:2 and 2:1;
- the total thickness of the protective coating layer is comprised between 20 and 500 μm, preferentially between 20 and 300 μm;
- the part is a turbine moving blade, or a high-pressure turbine nozzle, or a high-pressure turbine ring, or a combustion chamber wall.

According to a second aspect, the invention relates to a process for treating a turbomachine part comprising steps of depositing by thermal spraying a plurality of elementary layers on the surface of a substrate of the part, the substrate being formed of a metallic material, or of a composite material, to produce a protective coating layer against the infiltration of compounds of the CMAS type,

- the process comprising steps for depositing on the surface of the substrate elementary layers belonging to a first set, said steps being interposed between steps for depositing elementary layers belonging to a second set, the elementary layers of the first set having toughnesses which differ by at least 0.7 Mpa·m$^{1/2}$ from the toughnesses of the elementary layers of the second set,
- or the elementary layers of the first set having coefficients of thermal expansion which differ by at least 3.5 10$^{-6}$ K$^{-1}$ from the coefficients of thermal expansion of the elementary layers of the second set.

The process may have the following additional and non-limiting features:

- the steps for depositing elementary layers being carried out according to the suspension plasma spraying (SPS) technique, or according to one of the following other techniques: atmospheric plasma spraying (APS), solution precursor spraying plasma (SPPS), inert atmosphere or low pressure plasma spraying (IPS, VPS, VLPPS), PVD and EB-PVD, HVOF and Suspension HVOF (HVSFS), or according to a combination of several of these techniques;

The process further comprises a step, preliminary to the deposition of elementary layers, of depositing on the surface of the substrate a coating layer forming a thermal barrier, and/or of depositing a coating layer forming an environmental barrier, and/or of depositing a bond coat promoting the adhesion of a coating layer;

an elemental layer deposition step is carried out by a torch passage without cooling, and the directly subsequent elemental layer deposition step, or the directly preceding elemental layer deposition step, is carried out by a torch passage with cooling, the cooling being carried out by means of compressed air nozzles or by means of liquid carbon dioxide cryogenic nozzles, the coating layer can then be produced with inter-passes between torch passages without cooling and torch passages with cooling immediately following or preceding.

According to another aspect, the invention relates to a process for manufacturing a turbomachine part in which a thermal shock at the surface of the turbomachine part is caused between the deposition of a first elementary layer and the deposition of a second successive elementary layer, said thermal shock preferably being obtained by a torch passage without cooling after deposition of the first elementary layer, and a torch passage with cooling for the second elementary layer.

This last process allows the interface between the first elementary layer and the second elementary layer to be weakened in such a way as to promote the propagation of cracks within the plane of the interface.

GENERAL PRESENTATION OF THE FIGURES

Other features, purposes and advantages of the invention will be apparent from the following description, which is illustrative and non-limiting, and from the appended figures, including FIGS. 1a, 1b and 1c already described above, as well as the following other drawings:

FIG. 2a schematically represents the surface of a turbomachine part according to the invention, showing both transverse and horizontal cracking within a coating layer.

FIG. 2b schematically represents the part of FIG. 2a subjected to infiltration of molten CMAS compounds.

FIG. 2c schematically represents the advance of the infiltration front of the molten CMAS compounds into a crack in the part in FIGS. 2a and 2b.

DETAILED DESCRIPTION OF AN EMBODIMENT

Figure 2A:
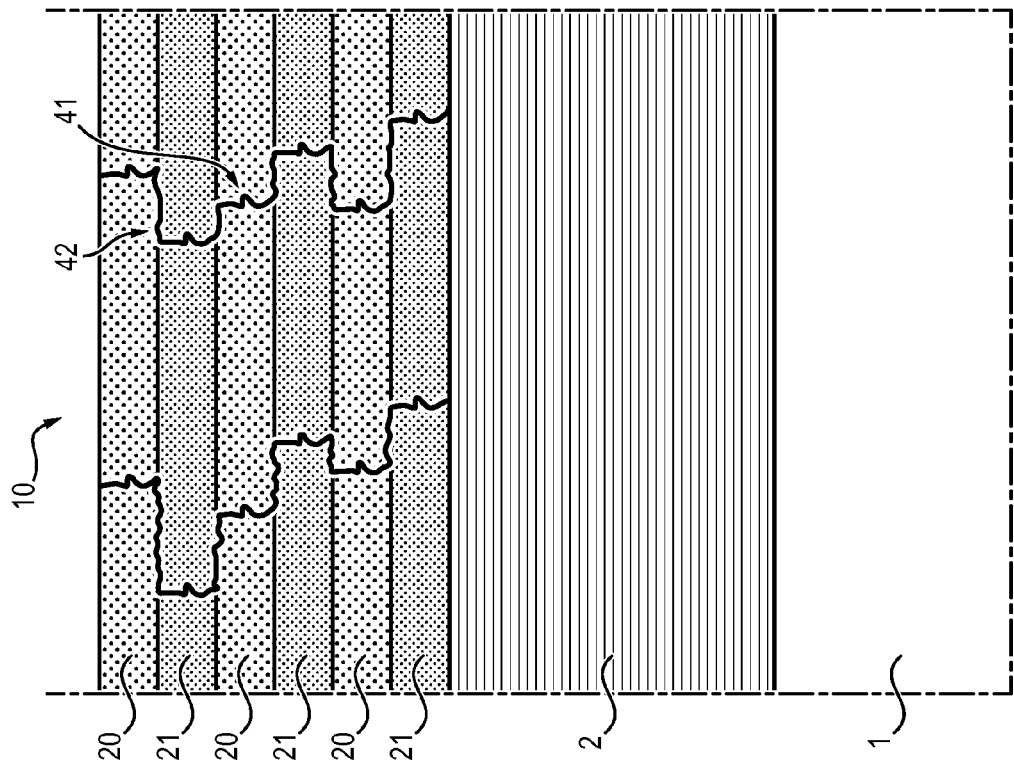
Figure 1C:
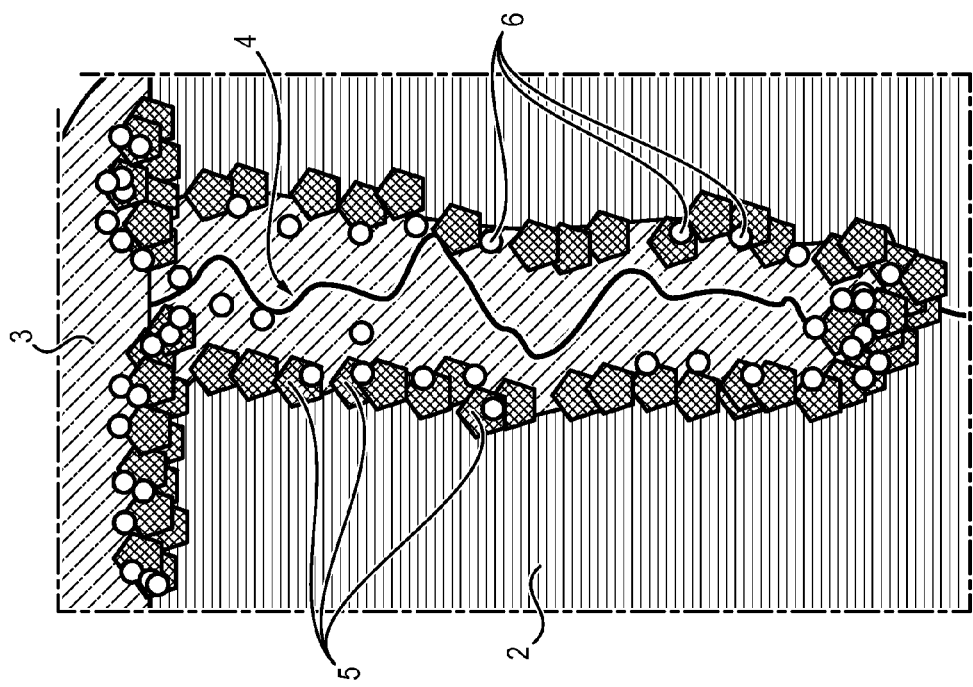

A turbomachine part 10 has been shown in FIG. 2a in a possible embodiment of the invention. The part 10 may comprise a substrate 1 of metallic material, for example a nickel-based or cobalt-based superalloy such as the known superalloys AM1, CM-NG, CMSX4 and its derivatives or the Rene superalloy and its derivatives. The part 10 may still include a ceramic matrix composite (also referred to as CMC) substrate 1. The part can be any turbomachine part exposed to thermal cycling and exposed to CMAS compounds at high temperature. The part 10 may in particular be a turbine moving blade, or a high-pressure turbine nozzle, or a high-pressure turbine ring, or a combustor wall.

The substrate 1 can be covered with an alumino-forming bonding layer (not shown in FIG. 2a) including for example MCrAlY type alloys (M=Ni, Co, Ni and Co), nickel aluminides type β-NiAl (modified or not by Pt, Hf, Zr, Y, Si or combinations of these elements), alloy aluminides γ-Ni-γ'-Ni3Al (modified or not by Pt, Cr, Hf, Zr, Y, Si or combinations of these elements), MAX phases ($M_{n+1}AX_n$ (n=1,2, 3) where M=Sc, Y, La, Mn, Re, W, Hf, Zr, Ti; A=groups IIIA, IVA, VA, VIA; X=C, N), or any other suitable bonding undercoat, as well as mixtures of the above-mentioned compositions.

In addition, the substrate 1 can be covered (as well as the possible alumino-bonding layer) with a coating layer forming a thermal barrier, or forming an environmental barrier, or forming a thermal and environmental barrier. Such a coating layer is not shown in FIG. 2a.

A thermal barrier may include yttriated zirconia, for example with a Y2O3 content of 7 to 8% by mass. Shaping of such a thermal barrier can be achieved by for example APS (atmospheric plasma spraying), SPS (suspension plasma spraying), SPPS (solution precursor plasma spraying), HVOF (high-velocity oxi-fuel), sol-gel process, HVSFS (high-velocity suspension flame spraying), EB-PVD (electron beam-physical vapor deposition), or any other known process for shaping thermal barriers.

An environmental barrier is advantageously used to protect a CMC substrate. A thermal and environmental barrier system may include one or more of the following group of materials: $MoSi_2$, BSAS ($BaO_{1-x}$—$SrO_x$—$Al_2O_3$-$2SiO_2$), Mullite ($3Al_2O_3$-$2SiO_2$), rare earth mono- and di-silicates (rare earth=Y, La, Ce, Pr, Nd, Pm, Sm, Eu, Gd, Tb, Dy, Ho, Er, Tm, Yb, Lu), fully or partially stabilized or even doped zirconia, or any other composition known for an environmental thermal barrier.

According to the invention, the substrate 1 is partially or completely covered (together with the possible alumino-forming bonding layer, and/or the possible thermal and/or environmental barrier layer) with a layer 2 thickness of a protective coating against the infiltration of CMAS-type compounds. The protective layer 2 comprises a plurality of elementary layers. The term "elementary layer" is used hereinbelow to refer to a layer thickness having a substantially homogeneous chemical composition and substantially homogeneous physico-chemical characteristics (for example homogeneous toughness and homogeneous coefficient of thermal expansion). The layer 2 advantageously comprises a number of elementary layers between 3 and 50, and preferentially between 3 and 35. A total thickness of the layer 2 is advantageously between 20 and 500 micrometers, preferably between 20 and 300 micrometers.

If a thermal or environmental barrier coating layer is present on the substrate, the functionalization layer can be referred to as the CMAS 2 protective layer.

Alternatively, the layer 2 can be applied directly to the substrate 1 in the absence of any other thermal or environmental barrier coating.

Among the elementary layers within the layer 2 and according to the embodiment illustrated in FIG. 2a, elementary layers 20 of a first set of elementary layers are distinguished from elementary layers 21 of a second set of elementary layers. The elementary layers 20 are inserted between the elementary layers 21. In the example shown, the layer 2 has only alternating elementary layers 20 and elementary layers 21. However, in an alternative not shown, elements belonging to a third type of layers, or more, could also be present within the layer 2, either interspersed with elements 20 and 21, or above or below a series of elements 20 and 21. The thickness of an elementary layer 20 or 21 is preferably comprised between 0.1 micrometers and 50 micrometers. The three elementary layers 20 and the first three elementary layers 21 closest to the surface have been represented in enlarged size, and the remaining consecutive elementary layers have been represented with a lesser thickness; however, a part according to the invention does not necessarily have this difference in thickness between the elementary layers, this mode of representation being chosen here to illustrate cracks.

According to the invention, the contact interfaces between an elementary layer 20 and an elementary layer 21 are adapted to promote the propagation of cracks along said interface. With the orientation of FIG. 2, the cracks thus intended to form, along the wear of the part 10 or during cooling of the part 10 after manufacture, will present a substantially horizontal orientation. Each contact zone between an elementary layer 20 and an elementary layer 21 thus forms a mechanically weakened interface which promotes crack propagation. A detailed description of the elemental layers 20 and 21 is given below in relation to Example 1.

Due to the presence of the mechanically weakened interfaces between the layers 20 and 21, as the part wears out, a cracking network is likely to develop with greater tortuosity than for a layer 2, which would be made up of a uniform thickness of composition. Such a cracking network, comprising cracks 42 oriented in the plane of the interface between two successive layers, and cracks 41 oriented transversely in the direction of the thickness of the layer 2, is shown in FIG. 2a. Hereinbelow, the cracks 42 will be referred to as "horizontal" cracks and the cracks 41 as "transverse" cracks. The layer 2 thus forms a controlled-cracking CMAS protective layer. It is easy to understand that the part could also include cracks with other orientations.

Figure 2C:
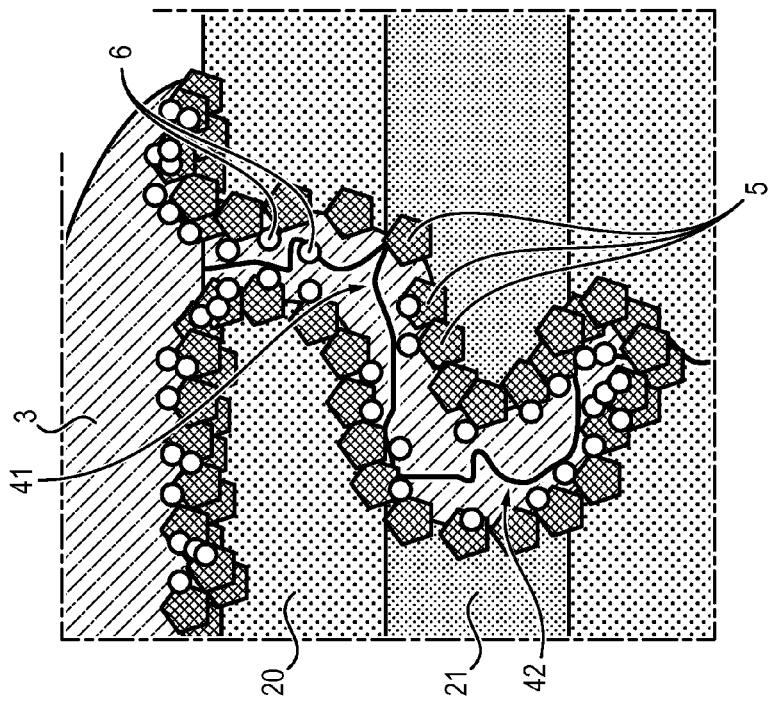
Figure 2B:
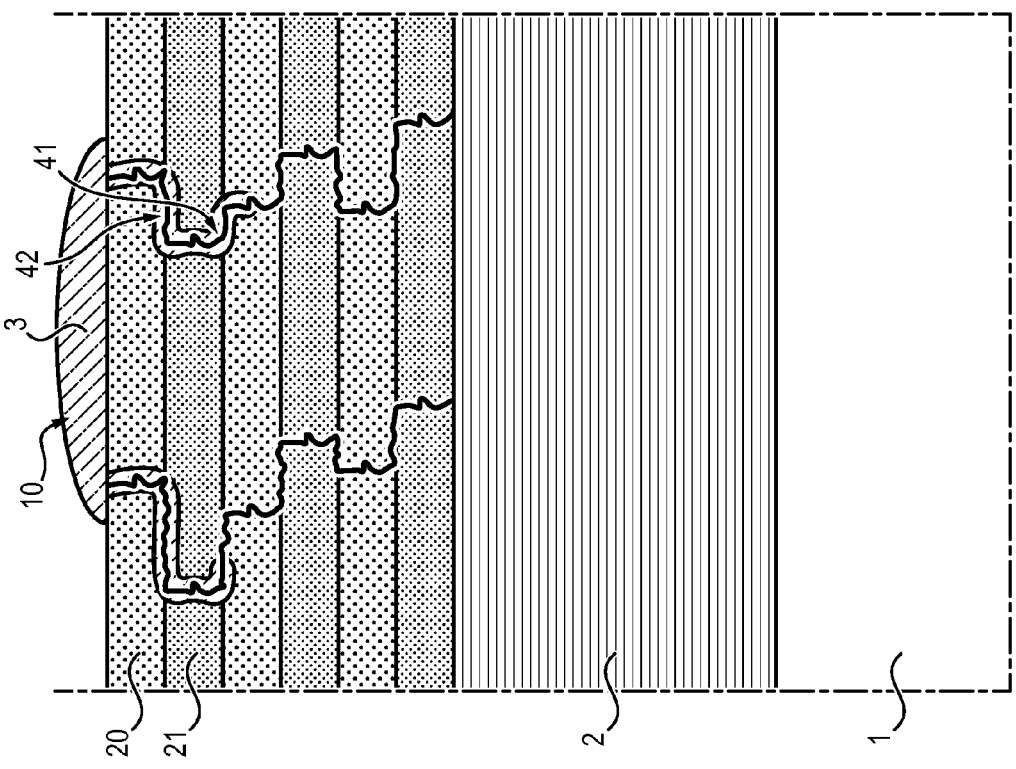

The same system is shown schematically in FIG. 2b, in an environment where CMAS-type liquid contaminant compounds are present at high temperatures. Due to the high surface temperature at the layer 2 during blade operation, form a liquid phase 3 at the surface of the layer 2. This liquid phase 3 gradually seeps through the thickness of the layer 2 over time via the cracks 42 and 41. The presence of horizontal cracks 42, in addition to transverse cracks 41, causes a lengthening of the infiltration path of the liquid phase 3. During exposure of the part 1 to molten CMAS compounds, it takes longer for the liquid phase 3 to reach the substrate 1.

FIG. 2c is a close-up schematic view of the interface between the liquid phase 3 and cracks 42 and 41 close to the surface of the part in FIG. 2b. During the infiltration of the liquid phase 3, there is competition between the kinetics of progression of said phase 3 within the cracks, and the reaction kinetics of the molten CMAS infiltrated with the anti-CMAS compounds within the elementary layers 20 and 21—examples of anti-CMAS chemical compounds are given below. Said reaction between molten CMAS and anti-CMAS compounds, which may be, for example, a crystallization reaction, forms a "blocking" phase 5 on the periphery of the infiltration path of the molten CMAS. The blocking phase 5 blocks the progression of the molten CMAS compounds. This can still be referred to as a "tight barrier layer". A secondary phase 6 can also be formed on the periphery of the cracks.

Compared with a part obtained by a crack-filling treatment, for example with a highly reactive ceramic, the part in FIGS. 2a to 2c is advantageous because the anti-CMAS deposition layer is not made mechanically rigid. In addition, the presence of cracks in the anti-CMAS coating makes it possible to accommodate thermomechanical deformations experienced by the part during operation, particularly those caused by thermal cycling. This constitutes an additional advantage of a part of the invention, compared with a part which would have undergone a treatment aimed at filling the cracks.

Figure 3:
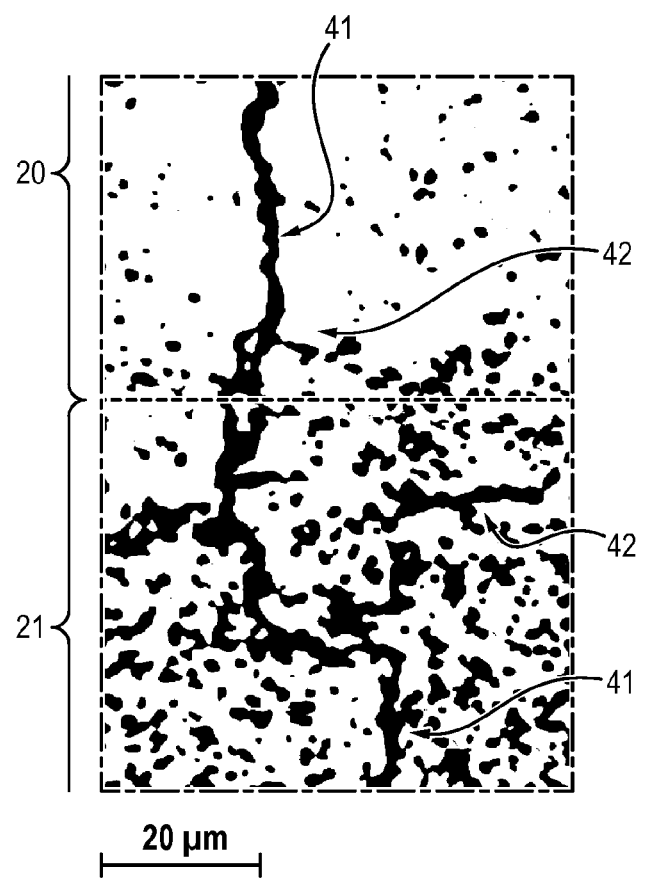
FIG. 3 is a view of a partially horizontal crack between two elementary layers of different toughness.

FIG. 3 shows a microscopic view of a cracked interface between an elemental layer 20 and an elemental layer 21. It can be seen that the crack network formed during thermal cycling of the part may be more complex than the simplified shape shown in FIGS. 2a to 2c. In particular, horizontal cracks 42 can be formed at the interface, shown here as dotted lines around the perimeter of the microscope view, but can also be formed at positions offset from the interface.

Process for Manufacturing a Controlled-Cracking Part—Example 1

Figure 4:
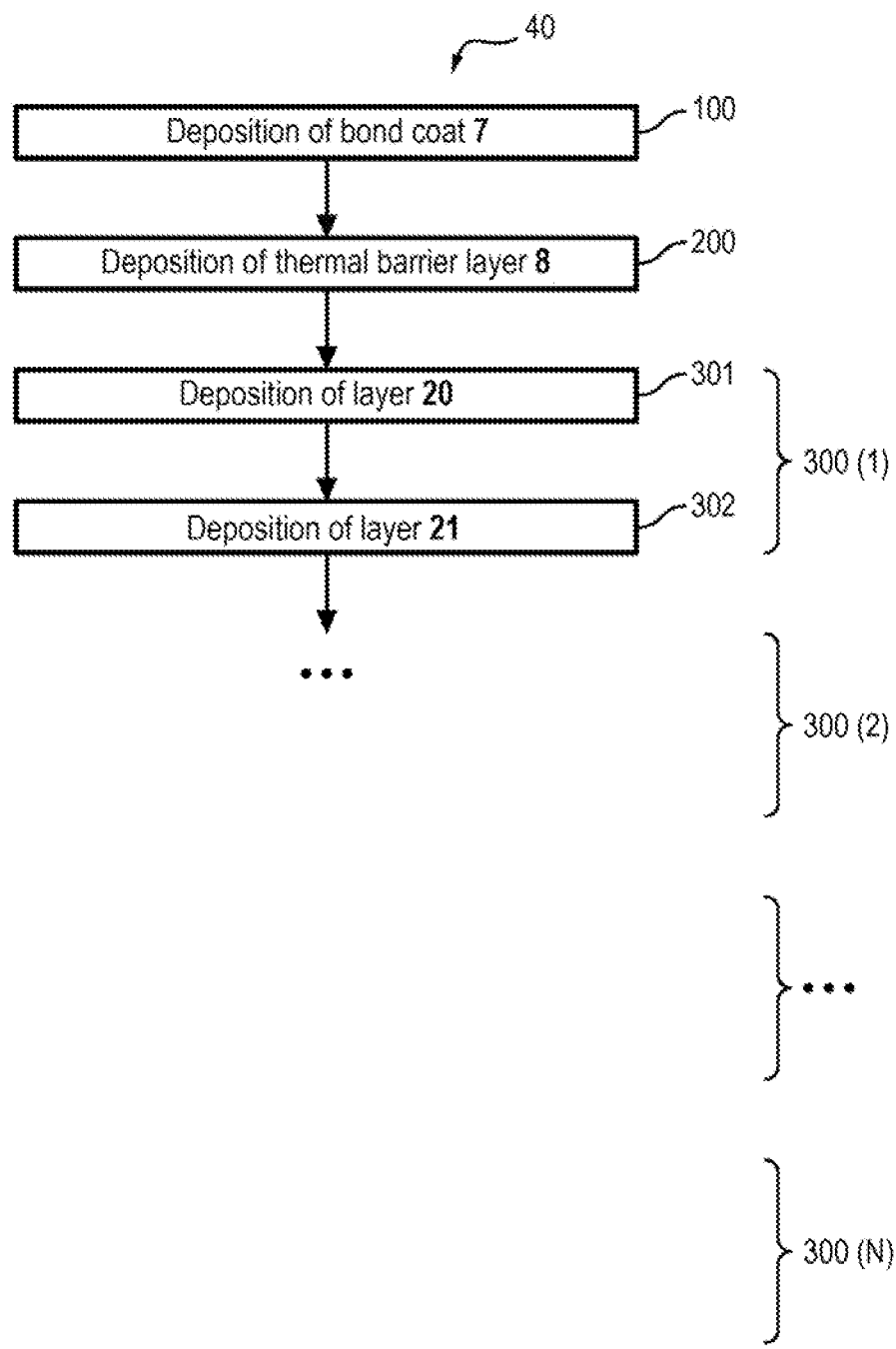
FIG. 4 represents the steps of a manufacturing process according to an alternative embodiment of a process of the invention.

A treatment process 40 for obtaining a part with controlled cracking, i.e. promoting the formation of cracks at the interfaces between elementary layers of coating, according to a first example of implementation, is illustrated in FIG. 4. It is considered that a substrate of the part to be treated is already formed upstream of said process, for example formed of metallic material or ceramic matrix composite (CMC).

In an optional step 100, an alumino-forming bonding layer 7 is deposited on the surface of the substrate, to promote the adhesion of the next layer, as described above in relation to FIG. 2a.

In an optional step 200, a thermal barrier layer 8, or environmental barrier (EBC), or thermal environmental barrier (TEBC) layer 8 is formed on the surface of the substrate, or on the surface of the bonding layer 7. This layer 8 can be obtained in particular by any thermal spray deposition technique, as described above in relation to FIG. 2a. In particular, step 200 is not essential if the subsequently deposited elemental layers act as a thermal barrier and/or environmental barrier.

A step 300 is then implemented to form a layer 2 of protective coating against the infiltration of CMAS-type compounds. Step 300 comprises a succession of sub-steps 300(1), 300(2) . . . 300(N), each of these sub-steps comprising a deposition 301 of an elemental layer 20, followed by a deposition 302 of an elemental layer 21. The depositions 301 and 302 are preferably achieved by thermal spraying techniques, for example, APS, SPS, SPPS, HVOF, sol-gel process, HVSFS, EB-PVD, inert plasma spraying or reduced pressure plasma spraying (inert plasma spraying, or IPS; vacuum plasma spraying, or VPS; very low pressure plasma spraying, or VLPPS).

Here, the elementary layers 20 have different toughnesses from the elementary layers 21, which creates mechanically weakened interfaces between said layers. Advantageously, the toughnesses of the elementary layers 20 differ by at least 0.7 MPa·m$^{1/2}$ from the toughnesses of the elementary layers 21. By way of example, the elementary layers 20 have a tenacity of between 0.5 and 1.5 MPa·m$^{1/2}$ and the elementary layers 21 have a tenacity of between 1.5 and 2.2 MPa·m$^{1/2}$. Not all the elementary layers 20 necessarily have the same toughness, as do the elementary layers 21.

In the example of the process 40, the layers 20 are formed of $Gd_2Zr_2O_7$, with a toughness of 1.02 MPa·m$^{1/2}$, and the layers 21 are formed of yttriated zirconia $ZrO_2$—7-8% mass $Y_2O_3$ (YSZ), with a toughness of 2.0 MPa·m$^{1/2}$.

The layers 20 are formed by suspension plasma spraying (hereinafter SPS). A "Sinplex Pro" torch with a volume flow rate of 80/20/5 standard liters per minute (slpm) is used for the steps 301. A YSZ/ethanol suspension with an injection rate of 40 to 50 grams per minute is used. The deposition rate of the YSZ is 2 micrometers of layer thickness 20 per deposition cycle, a cycle being defined as a round trip of the plasma torch in front of the surface to be treated of the part. Three deposition cycles are carried out for the deposition of an elementary layer 20, which thus has a thickness of 6 micrometers.

The layer 21 is formed by SPS using a "Sinplex" torch with an argon/helium/dihydrogen volume flow rate of 80/20/5 slpm. A $Gd_2Zr_2O_7$/ethanol suspension is used, with an injection rate of 40 to 50 grams per minute. The deposition rate of $Gd_2Zr_2O_7$ is 2 micrometers of layer thickness 21 per deposition cycle. Three deposition cycles are carried out for the deposition of an elementary layer 21, which thus has a thickness of 6 micrometers.

The same suspension injector is used to perform steps 301 and 302, with two separate suspension tanks open alternately for fluid communication with the suspension injector: a first tank is open for steps 301 and a second tank is open for steps 302.

The layer 2 of anti-CMAS coating is produced by a sequence of 25 steps 300 (N=25), for a total thickness of 300 micrometers.

Alternatively, a thickness of the layer 2 can be between 20 and 500 micrometers, preferentially between 20 and 300 micrometers.

Alternatively, steps 301 and 302 can be implemented:
Using a "Triplex Pro" torch with an argon/helium/dihydrogen volumetric flow rate with a slpm value selected from the following values: 80/20/0, 80/20/5, 80/0/5;
Using a "Sinplex Pro" torch with an argon/helium/dihydrogen volumetric flow rate in slpm of one of the following values: 50/0/5, 40/0/5, 80/20/0, 80/20/5, 80/0/5;
Using an "F4" torch with an argon/helium/dihydrogen volume flow rate in slpm of one of the following values: 45/45/3, 44/10/3, 45/30/5, 40/20/0, 30/50/5.

These values can also be used for processes 50 and 60 described below. Alternatively, the layers 20 can be formed from one of: RE2Zr2O7 with RE a rare earth material, Ba(Mg1/3Ta2/3)O3, La(Al1/4Mg1/2Ta1/4)O3, or a mixture of several of these materials.

Alternatively, the layers 21 can be formed from a material selected from: Y2O3-ZrO2-Ta2O5, BaZrO3, CaZrO3, SrZrO3, or a mixture of several of these materials.

According to an alternative, step 300 could include not only layer 20 deposition steps and layer 21 deposition steps, but could also include steps for the deposition of additional varieties of elementary layers.

In addition, a thermal shock can optionally be caused at the surface of the part between the deposition of an elementary layer 20 and the deposition of a successive elementary layer 21, or vice versa, said thermal shock being obtainable by a torch passage without cooling after deposition of the first elementary layer, and a torch passage with cooling for the second elementary layer. This has the effect of further weakening the interface between the elementary layers 20 and 21 to promote horizontal cracking.

Process for Manufacturing a Controlled Cracking Part—Example 2

Figure 5:
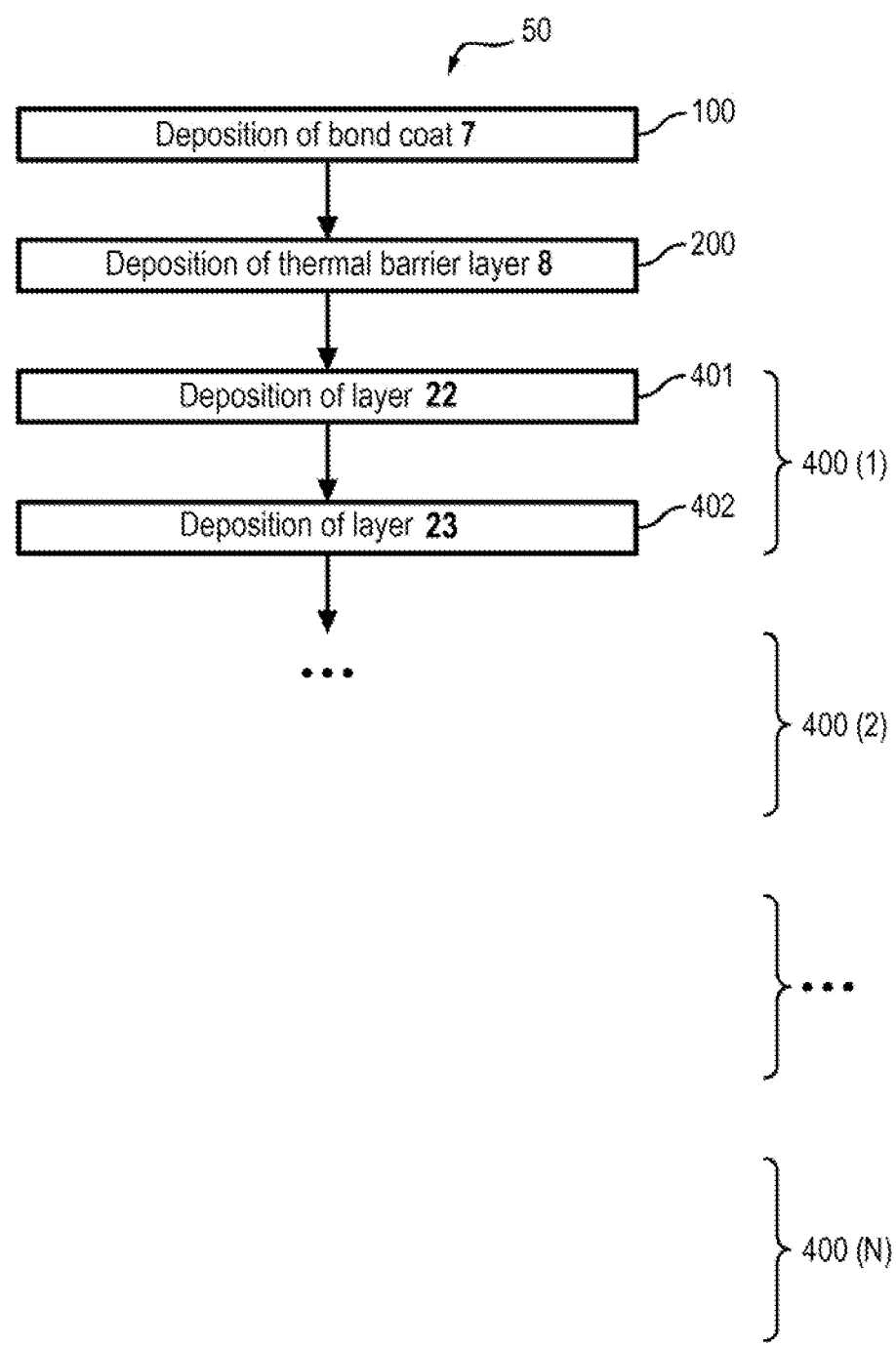
FIG. 5 represents the steps of a manufacturing process according to an alternative embodiment of a process of the invention.

A treatment process 50 to obtain a controlled cracking part according to a second example is given in FIG. 5.

Optional steps 100 and 200 are similar to the process steps 40.

A step 400 is then carried out to form a layer 2 of protective coating against the infiltration of CMAS-type compounds. Step 400 comprises a succession of sub-steps 400(1), 400(2) . . . 400(N), each of these sub-steps comprising a deposition 501 of an elemental layer 22, followed by a deposition 402 of an elemental layer 23.

In the example of the process 50, the layers 22 are formed from $Y_2Si_2O_7$, with a coefficient of thermal expansion of 3.9 $10^{-6}$ K$^{-1}$, and the layers 23 are formed from yttriated zirconia $ZrO_2$—7-8% mass $Y_2O_3$ (YSZ), with a coefficient of thermal expansion of 11.5 $10^{-6}$ K$^{-1}$. The layers 22 and 23 are formed by SPS using a "Sinplex Pro" torch with an argon/helium/dihydrogen volume flow rate of 40/0/5 slpm. A $Y_2Si_2O_7$/ethanol suspension is used for the layer 22 and YSZ/ethanol for the layer 23, with an injection rate of 40 to 50 grams per minute. The deposition rate of YSZ is 2 micrometers of the layer 23 thickness per injection cycle. Three injection cycles are carried out for the deposition of an elemental layer 23, which thus has a thickness of 6 micrometers. The deposition rate of $Y_2Si_2O_7$ is 1 micrometer layer 22 thickness per injection cycle. Three injection cycles are carried out for the deposition of an elementary layer 22, which thus has a thickness of 3 micrometers. The same suspension injector is used to carry out steps 401 and 402, with two separate suspension tanks open alternately for fluid communication with the suspension injector.

The layer 2 of anti-CMAS coating is produced by a sequence of 34 iterations of 400 steps (N=34), for a total thickness of about 300 micrometers. As for the process 40, thermal shocks can be induced to further weaken the interfaces between elementary layers.

Alternatively, the elemental layers 22 comprise $RE_2Si_2O_7$ or $RE_2SiO_5$ with RE a material of the rare earth family, or comprises a mixture of these materials.

Alternatively, the elementary layers 23 include a material from the following list: YSZ, Y2O3-ZrO2-Ta2O5, BaZrO3, CaZrO3, SrZrO3, RE2Zr2O7 with RE a material of the rare earth family, Ba(Mg1/3Ta2/3)O3, La(Al1/4Mg1/2Ta1/4)O3, YAG, or comprise a mixture of these materials.

Process for Manufacturing a Controlled Cracking Part—Example 3

Figure 6:
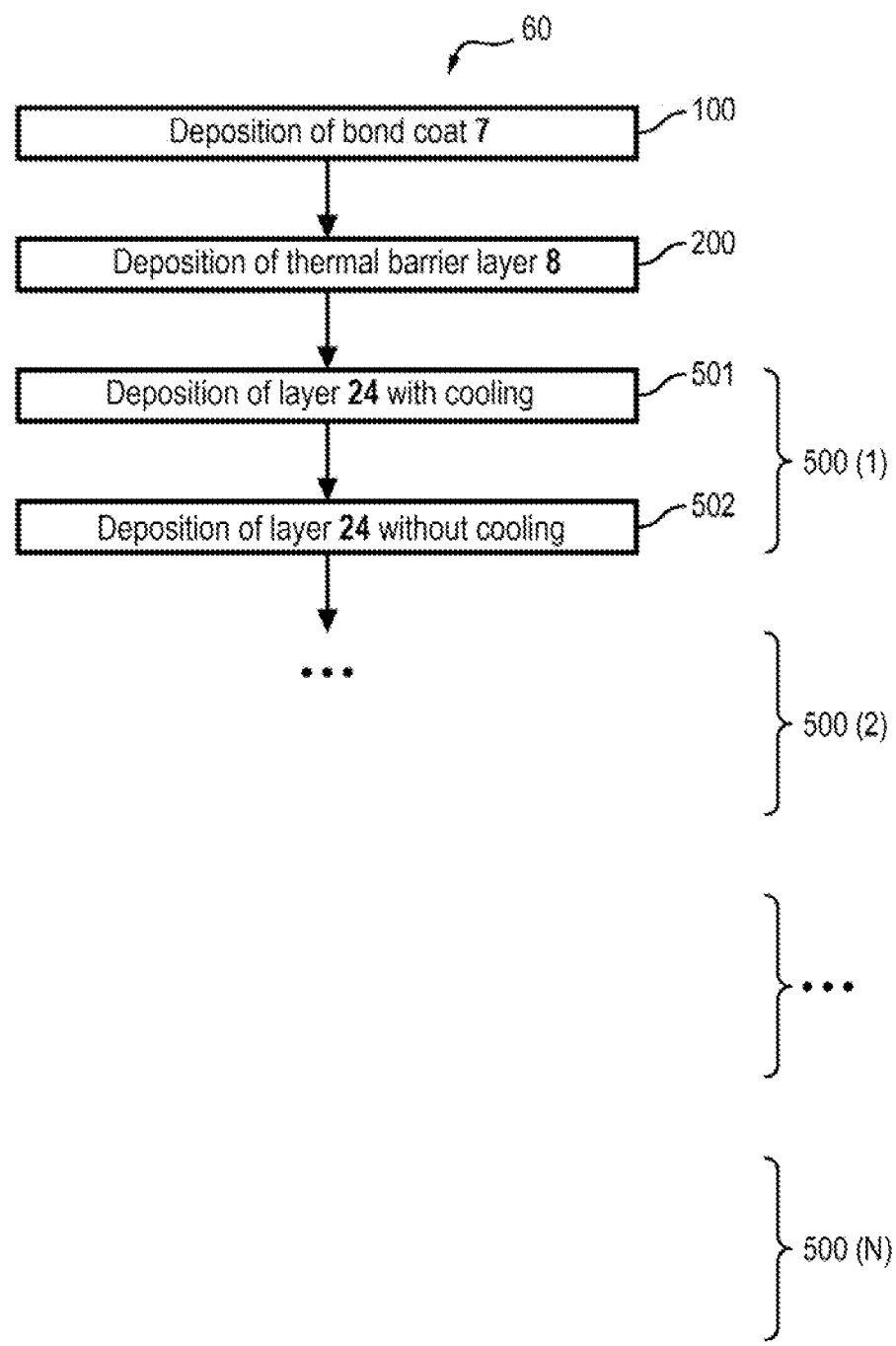
FIG. 6 represents the steps of a manufacturing process according to an alternative embodiment of a process of the invention.

A treatment process 60 to obtain a controlled cracking part according to a third example is given in FIG. 6.

Optional steps 100 and 200 are similar to the steps of the process 40.

A step 500 is then carried out to form a layer 2 of protective coating against CMAS. Step 600 comprises a succession of sub-steps 500(1) . . . 500(N) depending on the desired layer 2 thickness in particular. Each of said sub-steps comprises a first deposition 501 of elementary layer 24, and a second deposition 502 of elementary layer 24 according to a different protocol from the deposition 501.

Between a step 501 and a successive step 502, or vice versa, a thermal shock is caused by a torch passage without cooling at the end of step 501, and a torch passage with cooling at the end of step 502.

Cooling is achieved by means of compressed air nozzles, for example 6 nozzles at 6 bar of the carp tail type, or by means of liquid carbon dioxide cryogenic nozzles, for example two nozzles at 25 bar.

A deposition 500 is carried out here with inter-passes, with slow deposition kinematics (illumination speed less than 300 millimeters per second) and with a high mass loading rate (more than 20% by mass of solid particles in suspension).

In the particular example of the process 60, the layers 24 are formed from YSZ. Steps 501 and 502 are carried out with an "F4—MB" torch with an argon/helium/dihydrogen volume flow rate of 45/45/6 slpm, with a YSZ/ethanol suspension.

The depositions 501 are made with a mass loading rate of 12% and an injection rate of 25 to 30 grams per minute, for a thickness of 10 micrometers (2 micrometers per cycle). The depositions 502 are made with a mass loading rate of 20% and an injection rate of 45 to 50 grams per minute, for a thickness of 9 micrometers (3 micrometers per cycle). Preferentially, two separate suspension injectors are used to perform steps 501 and 502, with two separate, alternatively open suspension tanks.

In the example of process 60, N=16 iterations of steps 500 are carried out, for a total thickness of about 300 micrometers for the layer 2.

Examples of Controlled Cracking Turbomachine Parts

FIGS. 7a to 7d schematically represent several examples of layer stacks implemented for turbomachine parts according to the invention.

The anti-CMAS deposition layers 2 shown in FIGS. 7a to 7d are obtained for example by any of the processes described above.

Figure 7A:
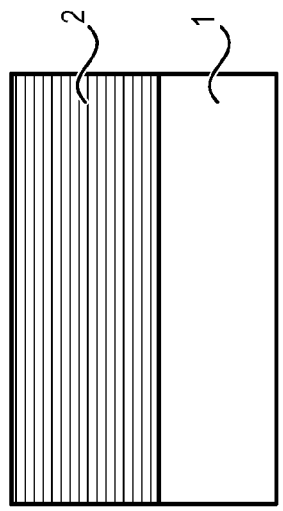
FIG. 7a represents a multilayer CMAS protective stack as a first example.

FIG. 7a represents a part comprising a metal alloy substrate 1 coated with a layer 2 of anti-CMAS coating. In this example, the layer 2 can act as both a thermal barrier and an anti-CMAS coating.

Figure 7B:
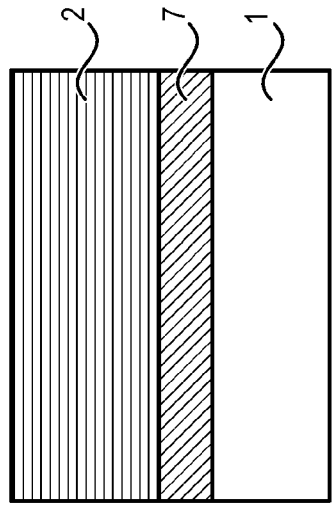
FIG. 7b represents a multilayer CMAS protective stack in a second example.

In FIG. 7b, an alumino-forming bonding layer 7 is interposed between substrate 1 and the anti-CMAS layer 2.

Figure 7C:
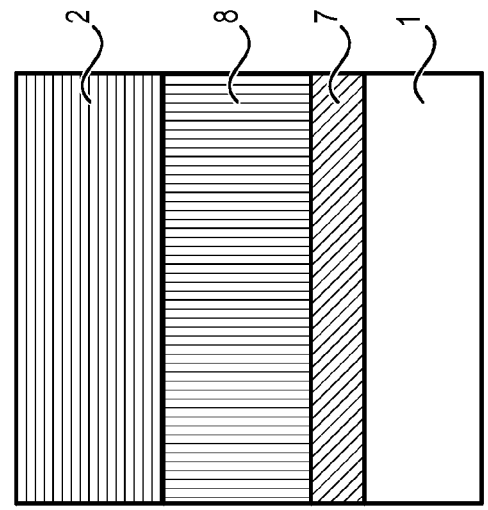
FIG. 7c represents a multilayer CMAS protective stack in a third example.

In FIG. 7c, a thermal barrier layer 8 is interposed between the bonding layer 7 and the anti-CMAS 2 layer. The anti-CMAS 2 deposition can be a functionalization layer that does not act as a thermal barrier.

Figure 7D:
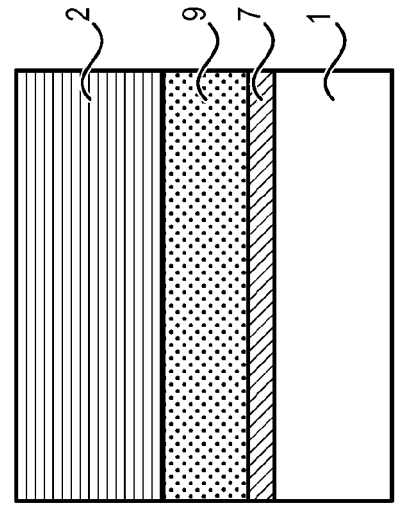
FIG. 7d represents a multilayer CMAS protective stack in a fourth example.

In FIG. 7d, the substrate 1 is formed as a ceramic matrix composite (CMC). The substrate is coated with a bonding layer 7, a thermal and environmental barrier (TEBC) layer 9 and an anti-CMAS deposition layer 2.

The parts shown in FIGS. 7a to 7d have, as described above, mechanically weakened interfaces which promote cracking in planes substantially parallel to the surface of the part.

The invention claimed is:

1. A turbomachine part comprising:
   a substrate of metallic material, or of composite material; and
   a protective coating layer against the infiltration of compounds of the oxides of calcium, magnesium, aluminum or silicon type, referred to as CMAS type, the coating layer at least partially covering the surface of the substrate,
   wherein the protective coating layer comprises a plurality of elementary layers,
   wherein elementary layers of a first set of the plurality of elementary layers are interposed between elementary layers of a second set of the plurality of elementary layers, each elementary layer of the first set and each elementary layer of the second set comprising an anti-CMAS compound, and
   wherein each contact zone between an elementary layer of the first set and an elementary layer of the second set forms an interface promoting a propagation of cracks along said interface,
   wherein each elementary layer of the first set has a toughness which differs by at least 0.7 MPa·m$^{1/2}$ from the toughnesses of all elementary layers of the second set, or
   wherein each elementary layer of the first set has a coefficient of thermal expansion which differs by at least 3.5 10$^{-6}$ K$^{-1}$ from the coefficients of thermal expansion of all elementary layers of the second set.

2. The turbomachine part as claimed in claim 1, wherein each elementary layer of the first set has a toughness which differs by at least 0.7 MPa·m$^{1/2}$ from the toughnesses of all elementary layers of the second set, wherein the toughness of each of the elementary layers of the first set is comprised between 0.5 and 1.5 MPa·m$^{1/2}$ and the toughness of each of the elementary layers of the second set is comprised between 1.5 and 2.2 MPa·m$^{1/2}$.

3. The turbomachine part as claimed in claim 1, wherein each elementary layer of the first set has a toughness which differs by at least 0.7 MPa·m$^{1/2}$ from the toughnesses of all elementary layers of the second set, wherein the elementary layers of the first set comprise a material from the following list: RE2Zr2O7 with RE a material of the rare earth family, Ba(Mg1/3Ta2/3)O3, La(Al1/4Mg1/2Ta1/4)O3, or comprise a mixture of several of these materials.

4. The turbomachine part as claimed in claim 1, wherein each elementary layer of the first set has a toughness which differs by at least 0.7 MPa·m$^{1/2}$ from the toughnesses of all elementary layers of the second set, wherein the elementary layers of the second set comprise a material from the following list: YSZ, Y2O3-ZrO2-Ta2O5, BaZrO3, CaZrO3, SrZrO3, or comprise a mixture of several of these materials.

5. The turbomachine part as claimed in claim 1, wherein each elementary layer of the first set has a coefficient of thermal expansion which differs by at least 3.5 10$^{-6}$ K$^{-1}$ from the coefficients of thermal expansion of all elementary layers of the second set, wherein the coefficient of thermal expansion of each of the elementary layers of the first set is comprised between 3.5 and 6.0 10$^{-6}$ K$^{-1}$ and the coefficient of thermal expansion of each of the elementary layers of the second set is comprised between 7.0 and 12.0 10$^{-6}$ K$^{-1}$.

6. The turbomachine part as claimed in claim 1, wherein each elementary layer of the first set has a coefficient of thermal expansion which differs by at least 3.5 10$^{-6}$ K$^{-1}$ from the coefficients of thermal expansion of all elementary layers of the second set, wherein the elementary layers of the first set comprise RE2Si2O7 or RE2SiO5 with RE a material of the rare-earth family, or comprise a mixture of these materials.

7. The turbomachine part as claimed in claim 1, wherein each elementary layer of the first set has a coefficient of thermal expansion which differs by at least 3.5 10$^{-6}$ K$^{-1}$ from the coefficients of thermal expansion of all elementary layers of the second set, wherein the elementary layers of the second set comprise a material from the following list: YSZ, Y2O3-ZrO2-Ta2O5, BaZrO3, CaZrO3, SrZrO3, RE2Zr2O7 with RE a material of the rare earth family, Ba(Mg1/3Ta2/3)O3, La(Al1/4Mg1/2Ta1/4)O3, YAG, or comprise a mixture of several of these materials.

8. The turbomachine part as claimed in claim 1, wherein a ratio of a cumulative thickness of the elementary layers of the first set to a cumulative thickness of the elementary layers of the second set is between 1:2 and 2:1.

9. The turbomachine part as claimed in claim 1, where a total thickness of the protective coating layer is between 20 and 500 μm.

10. The turbomachine part as claimed in claim 1, wherein the turbomachine part forms a turbine moving blade, or a high-pressure turbine nozzle, or a high-pressure turbine ring, or a combustion chamber wall.

11. The turbomachine as claimed in claim 9, wherein the total thickness of the protective coating layer is between 20 and 300 μm.

* * * * *